United States Patent
Kitamura et al.

(10) Patent No.: US 10,811,947 B2
(45) Date of Patent: Oct. 20, 2020

(54) ROTARY ELECTRIC MACHINE

(71) Applicant: Mitsubishi Electric Corporation, Tokyo (JP)

(72) Inventors: Ryuji Kitamura, Tokyo (JP); Masashi Nakamura, Tokyo (JP); Shogo Okamoto, Tokyo (JP); Masaya Inoue, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 568 days.

(21) Appl. No.: 15/542,705

(22) PCT Filed: Feb. 23, 2015

(86) PCT No.: PCT/JP2015/055005
§ 371 (c)(1),
(2) Date: Jul. 11, 2017

(87) PCT Pub. No.: WO2016/135819
PCT Pub. Date: Sep. 1, 2016

(65) Prior Publication Data
US 2017/0358974 A1    Dec. 14, 2017

(51) Int. Cl.
*H02K 24/00* (2006.01)
*H02K 11/21* (2016.01)
(Continued)

(52) U.S. Cl.
CPC ............ *H02K 24/00* (2013.01); *H02K 1/24* (2013.01); *H02K 11/20* (2016.01); *H02K 11/21* (2016.01); *H02K 11/225* (2016.01)

(58) Field of Classification Search
CPC .......... H02K 11/20; H02K 11/21; H02K 1/24; H02K 24/00; H02K 11/225; G01P 3/488
See application file for complete search history.

(56) References Cited

U.S. PATENT DOCUMENTS 4,631,510 A * 12/1986 Nagarkatti ............ H02K 29/12
310/168
4,928,046 A * 5/1990 Karasawa ............ G01D 5/243
310/111
(Continued)

FOREIGN PATENT DOCUMENTS

CN         103812273 A    5/2014
DE   10 2005 044 350 A1  10/2006
(Continued)

OTHER PUBLICATIONS

International Search Report of PCT/JP2015/055005, dated May 26, 2015. [PCT/ISA/210].
(Continued)

*Primary Examiner* — Mohamad A Musleh
(74) *Attorney, Agent, or Firm* — Sughrue Mion, PLLC; Richard C. Turner

(57) ABSTRACT

Obtain a rotary electric machine in which attachment of a sensor stator to a case having a cylindrical shape is not required, and a stator is inserted to the case having a cylindrical shape, whereby the sensor stator can be easily arranged at the inside of the case having a cylindrical shape. The rotary electric machine includes a rotor and a sensor rotor, which are maintained to a rotary shaft and are arranged in a shaft direction of the rotary shaft; a stator which is faced to the rotor and is arranged at the inside of a case having a cylindrical shape; and a sensor stator which is supported to sensor supporting components which are provided at end portions in a shaft direction of the stator, and is faced to the sensor rotor and is arranged.

17 Claims, 7 Drawing Sheets

(51) Int. Cl.
*H02K 11/20* (2016.01)
*H02K 1/24* (2006.01)
*H02K 11/225* (2016.01)

(56) References Cited

U.S. PATENT DOCUMENTS

| | | | | |
|---|---|---|---|---|
| 4,952,830 | A * | 8/1990 | Shirakawa | H02K 29/08 310/68 B |
| 6,225,715 | B1 * | 5/2001 | Hoda | H02K 5/15 310/67 R |
| 6,777,843 | B2 * | 8/2004 | Hayashi | H02K 11/21 310/168 |
| 7,646,194 | B2 * | 1/2010 | Makino | B62D 5/0403 310/168 |
| 2002/0005674 | A1 * | 1/2002 | Hayashi | G01P 3/488 310/168 |
| 2003/0067233 | A1 | 4/2003 | Hayashi et al. | |
| 2006/0220481 | A1 * | 10/2006 | Takekawa | H02K 11/225 310/90.5 |
| 2006/0226719 | A1 * | 10/2006 | Nakanishi | H02K 7/20 310/68 B |
| 2008/0169713 | A1 * | 7/2008 | Kataoka | G01D 5/2013 310/71 |
| 2008/0258585 | A1 | 10/2008 | Kataoka et al. | |
| 2009/0250287 | A1 * | 10/2009 | Takashima | B62D 5/0406 180/444 |
| 2010/0288577 | A1 * | 11/2010 | Sonoda | B62D 5/0406 180/446 |
| 2010/0314192 | A1 * | 12/2010 | Nagase | B62D 5/0406 180/444 |

FOREIGN PATENT DOCUMENTS

| | | |
|---|---|---|
| JP | 2003-114139 A | 4/2003 |
| JP | 2006-158014 A | 6/2006 |
| JP | 2008-268065 A | 11/2008 |
| JP | 5138489 B2 | 2/2013 |
| JP | 2013-225953 A | 10/2013 |

OTHER PUBLICATIONS

Communication from the State Intellectual Property Office of the P.R.C. dated Jul. 26, 2019 in application No. 201580075769.2.
Communication dated Jan. 3, 2019, from State Intellectual Property Office of the P.R.C. in counterpart application No. 201580075769.2.
Communication dated Aug. 22, 2017, issued by the Japanese Patent Office in counterpart application No. 2017-501570.
Communication dated Jun. 30, 2020 by the German Patent Office in application No. 11 2015 006 209.2.

* cited by examiner

ROTARY ELECTRIC MACHINE

CROSS REFERENCE TO RELATED APPLICATIONS

This application is a National Stage of International Application No. PCT/JP2015/055005 filed Feb. 23, 2015, the contents of all of which are incorporated herein by reference in their entirety.

BACKGROUND OF THE INVENTION

Technical Field

The present invention relates to a rotary electric machine which includes a sensor rotor and a sensor stator.

Background Art

In conventional rotary electric machines in which a resolver, which is a kind of sensor, is included, there is a rotary electric machine which has a configuration in which a resolver stator, which is used as a sensor stator, is fixed to the inside of an end plate which closes an aperture of a yoke housing, which is used as a case having a cylindrical shape, in other words, a rotary electric machine which has a type in which the sensor stator is attached to a rotary electric machine inside of the case having a cylindrical shape (for example, refer to Patent Document 1), or there is a rotary electric machine which has a configuration in which a resolver stator, which is used as a sensor stator, is attached to the outside of a flange which is provided at an aperture of a stator case, which is used as a case having a cylindrical shape, in other words, a rotary electric machine which has a type in which the sensor stator is attached to a rotary electric machine outside of the case having a cylindrical shape (for example, refer to Patent Document 2).

CONVENTIONAL ART DOCUMENT

Patent Document

Patent Document 1: Japanese Patent Publication No. 5138489
Patent Document 2: Japanese Laid-Open Patent Publication No. 2013-225953

SUMMARY OF THE INVENTION

Problems to be Solved by the Invention

This kind of conventional rotary electric machine is configured as described above, so that it is required that a terminal portion of a signal. line of a sensor stator is electrically connected to a terminal portion (an outside terminal portion) of a signal line of a control device which is positioned at the outside of a case having a cylindrical shape. Therefore, in a configuration in which a stator is attached to an end plate having a cylindrical shape, a flange or the like as described in the above Patent Document 1 and Patent Document 2, it is required that a process in which the sensor stator is attached to the case having a cylindrical shape, a process in which a signal line of the sensor stator is wired, a process in which a terminal potion of the sensor stator is connected to the outside terminal portion, a process in which a stator is attached to the case having a cylindrical shape, a process in which a signal line of the stator is wired, and a process in which a terminal potion of the stator is connected to the outside terminal portion are separately performed, and the number of the processes for attachment work is increased. Moreover, in a configuration in which the sensor stator is attached to the case having a cylindrical shape as described above, it is required that an attachment configuration component, by which the sensor stator is attached to the case having a cylindrical shape, is provided, so that the case having a cylindrical shape has a complicate configuration. Moreover, a length of the rotary electric machine in a shaft direction is increased.

The present invention has been made to solve the above-described problems, and an object of the invention is to obtain a rotary electric machine in which it is not required that a sensor stator is attached to a case having a cylindrical shape, and a stator is attached to the case having a cylindrical shape, whereby the sensor stator can be easily arranged at the inside of the case having a cylindrical shape.

Means for Solving Problems

A rotary electric machine of the present invention includes a rotor and a sensor rotor, which are maintained to a rotary shaft and are arranged in a shaft direction of the rotary shaft; a stator which is faced to the rotor and is arranged at the inside of a case having a cylindrical shape; and a sensor stator which is supported to sensor supporting components which are provided at end portions in a shaft direction of the stator, and is faced to the sensor rotor and is arranged.

Effects of the Invention

According to the rotary electric machine of the present invention, the rotary electric machine can be obtained in which a sensor stator can be easily arranged at the inside of a case having a cylindrical shape.

An object, a characteristic, and an effect of the present invention will be more clearly described by the minute explanations and the descriptions of the drawings in the following embodiments.

MODE FOR CARRYING OUT THE INVENTION

Hereinafter, embodiments of the present invention will be minutely described in reference to the drawings. In addition, reference symbols, which are the same as those in each of the drawings, refer to the same or equivalent parts.

Embodiment 1

Figure 1:
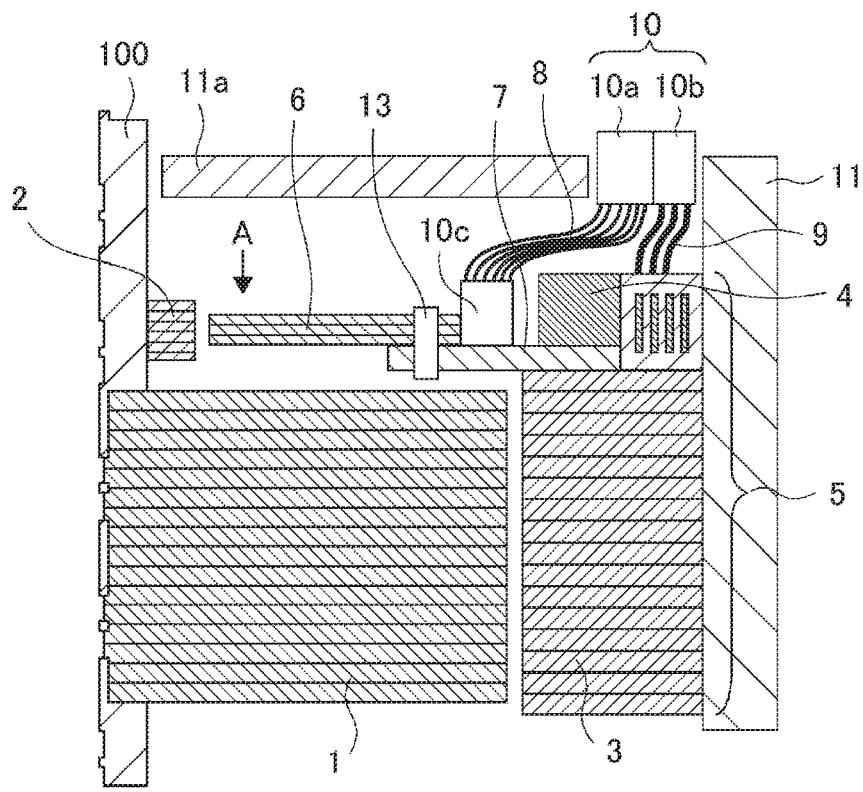
FIG. 1 is a cross-sectional view illustrating a rotary electric machine according to Embodiment 1 of the present invention.

FIG. 1 is a cross-sectional view illustrating a rotary electric machine according to Embodiment 1 of the present invention.

A rotor 1 and a sensor rotor (for example, a resolver rotor) 2 are provided in parallel in a shaft direction at a rotary shaft 100 of the rotary electric machine. A stator 5, which includes a stator core 3 and a coil 4, is arranged at the inside of a case 11 having a cylindrical shape of the rotary electric machine in such a way that the stator 5 is faced to a circumference of the rotor 1. A sensor stator (for example, a resolver stator) 6 is supported by rivets 13 at an end portion of the stator core 3, in other words, at end portions of sensor supporting components 7 (end portions of a rotary shaft 100 side), which are provided at an end portion in a shaft direction of the stator 5, in such a way that the sensor stator 6 is faced to a circumference of the sensor rotor 2, A terminal portion of a signal line 8 of the sensor stator 6 and a terminal portion of a signal line 9 for feeding an electric power, which is connected to the coil 4 of the stator 5, are respectively connected to a first terminal block 10a and a second terminal block 10b, which are included in a terminal block 10 for connecting to the outside, which is attached to a lid 11a which covers an aperture which is formed at an end portion of the case 11. Moreover, the other terminal portion of the signal line 8 of the sensor stator 6 is connected to the sensor stator 6 by a third terminal block 10c. A length of the sensor rotor 2 in a rotary shaft direction is not equal and is different to a length of the sensor stator 6 in the rotary shaft direction.

The rotary electric machine is assembled in such a way that the rotor 1 and the sensor rotor 2, which are maintained to the rotary shaft 100, and the stator 5, in which a plurality of slots are formed, and is faced to the rotor 1 so as to be arranged, are inserted to the case 11 having a cylindrical shape.

The stator 5 is composed of the stator core 3, the coil the sensor stator 6, the sensor supporting components 7, the signal line 8 of the sensor stator 6, the signal line 9 of the stator 5, and the terminal block 10.

The stator core 3, in which thin electromagnetic sheets are laminated, is assembled by tightening or welding the stator core 3 in such a way that the electromagnetic sheets are not separated each other.

The stator core 3 is composed of an integrated core or a separated core. When the stator core 3 is composed of the integrated core, the stator core 3 is formed in a cylindrical shape by a welding method, an annular press-inserting method, an annular burn-inserting method or the like.

The stator core 3 includes teeth portions by which a plurality of slots are formed, and a coil, which is covered by an insulating film, is wound around each of the teeth portions, and the sensor supporting components 7 are respectively mounted at one end portion in an axis direction of each of the teeth portions. The sensor supporting components 7 are configured by using a non-magnetic material.

When the sensor supporting components 7 have a sufficient strength, it is not required that the sensor supporting components 7 are certainly mounted at all teeth portions.

The coil 4 is insulated from the teeth portions and the sensor supporting components 7 by the insulating film.

FIG. 2 through FIG. 5 are arrow seeing views which schematically indicate an attachment main portion of a sensor, which is viewed from an arrow "A" direction in FIG. 1 in order to explain an assembly process of the sensor stator 6. For the convenience sake of explaining the assembly process, the rotary shaft 100 and the sensor rotor 2 are also indicated.

Figure 2:
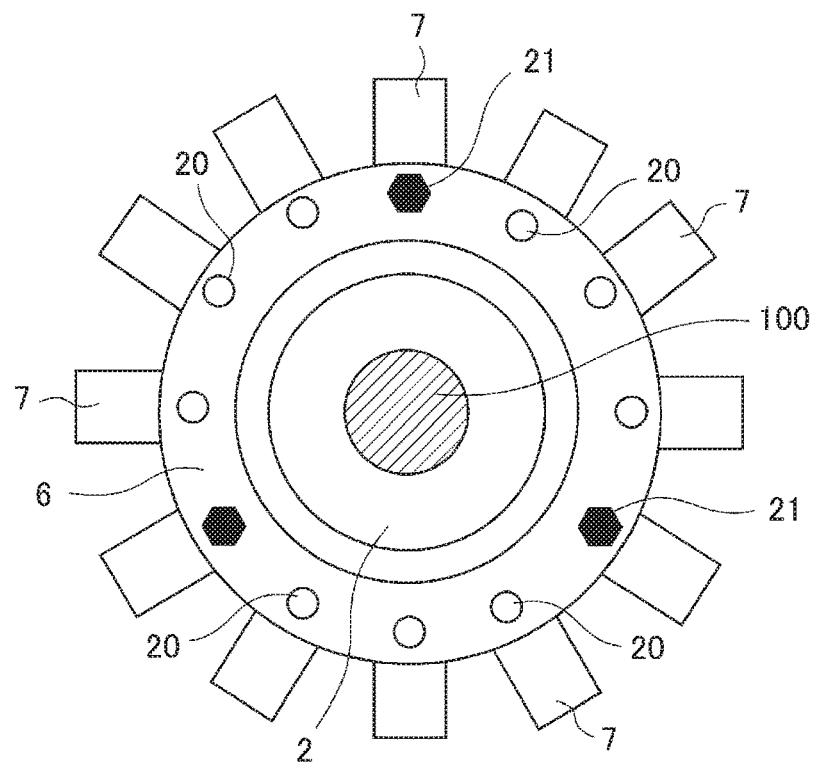
FIG. 2 is an arrow seeing view illustrating an attachment main portion of a sensor, which is viewed from an arrow "A" direction in FIG. 1 in order to explain a first assembly process of a sensor stator which is provided in the rotary electric machine according to Embodiment 1 of the present invention.

FIG. 2 indicates a state of the sensor stator 6 in a first assembly process of the sensor stator 6.

A plurality of sensor supporting components 7 are mounted at the teeth portions of the above-described stator core 3. Connecting holes 20 are provided at outer circumference positions, which are corresponding to the sensor supporting components 7, at the sensor stator 6, and the sensor stator 6 has a connecting portion which is connected to the sensor supporting components 7. At this step, screws 21, which are used for a temporarily connecting process, are inserted to the connecting holes 20, and the screws 21 are screwed and fixed to the sensor supporting components 7, and the sensor stator 6 and the sensor supporting components 7 are connected, whereby the sensor stator 6 and the sensor supporting components 7 are temporarily fixed. In the rotary electric machine according to Embodiment 1, although the sensor stator 6 and the sensor supporting components 7 are temporarily fixed by using three screws 21, the sensor stator 6 and the sensor supporting components 7 can be connected by using at least one screw 21, and the number of the screws 21 is not limited to three.

Figure 3:
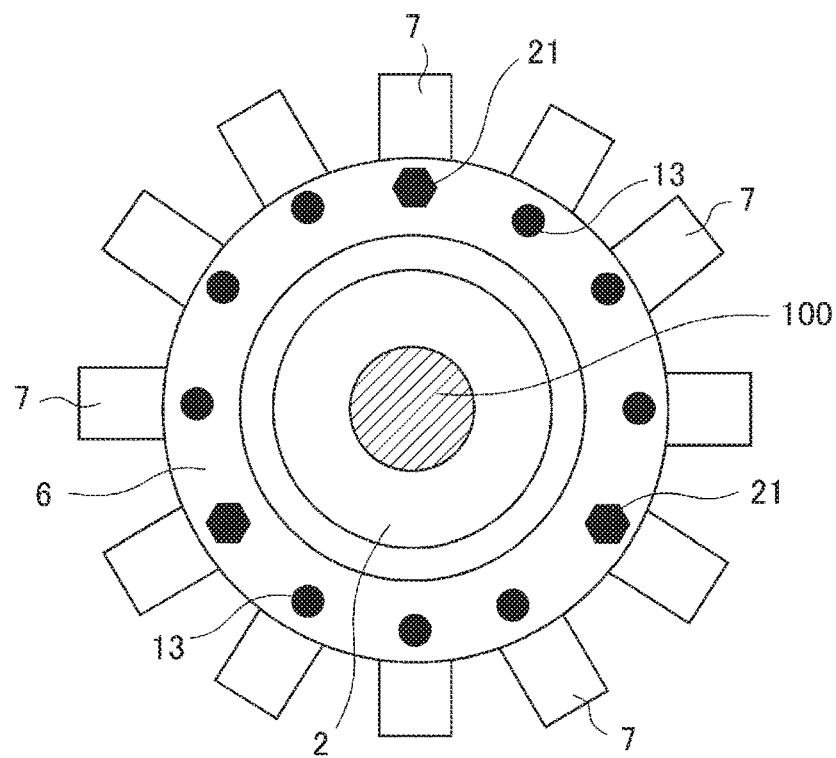
FIG. 3 is an arrow seeing view illustrating the attachment main portion of the sensor, which is viewed from the arrow "A" direction in FIG. 1 in order to explain a second assembly process of the sensor stator which is provided in the rotary electric machine according to Embodiment 1 of the present invention.

After the sensor stator 6 is temporarily fixed to the sensor supporting components 7 by using the screws 21, which are used for a temporarily connecting process, as indicated in FIG. 3, and after the rivets 13 are inserted to the connecting holes 20 in a second assembly process, the rivets 13 are tightened, whereby the sensor stator 6 and the sensor supporting components 7 are fixed.

Figure 4:
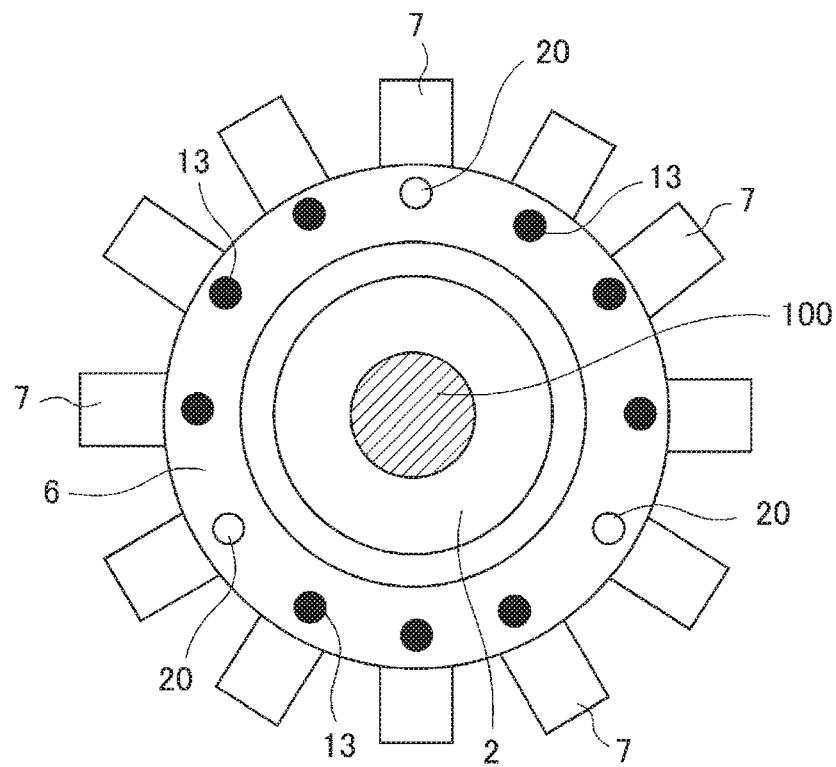
FIG. 4 is an arrow seeing view illustrating the attachment main portion of the sensor, which is viewed from the arrow "A" direction in FIG. 1 in order to explain a third assembly process of the sensor stator which is provided in the rotary electric machine according to Embodiment 1 of the present invention.

After the sensor stator 6 is fixed to the sensor supporting components 7 in the second assembly process, as indicated in FIG. 4, the screws 21, which are used for a temporarily connecting process, are removed from the connecting holes 20 in a third assembly process. In the third assembly process, the sensor stator 6 is fixed to the sensor supporting components 7 by the rivets 13, In this state, the sensor stator 6 is integrally arranged with the stator 5 via the sensor supporting components 7.

Figure 5:
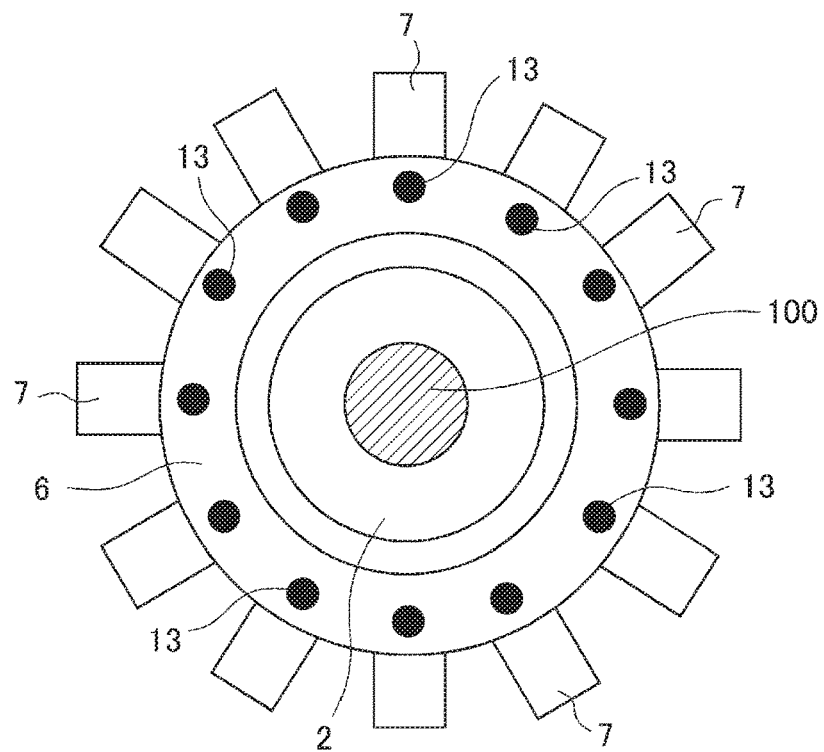
FIG. 5 is an arrow seeing view illustrating the attachment main portion of the sensor, which is viewed from the arrow "A" direction in FIG. 1 in order to explain a fourth assembly process of the sensor stator which is provided in the rotary electric machine according to Embodiment 1 of the present invention.

In addition, after the screws 21, which are used for a temporarily connecting process, are removed from the connecting holes 20 in the third assembly process, as indicated in FIG. 5, and after the rivets 13 are more inserted to the connecting holes 20 in a fourth assembly process, the rivets 13 are tightened, whereby the sensor stator 6 may be fixed to the sensor supporting components 7, When the rivets 13, which are used for a fixing process, are increased, the sensor stator 6 can be strongly fixed to the sensor supporting components 7.

The stator 5 is inserted to the case 11 having a cylindrical shape from the shaft direction of the stator 5 so as to be assembled in a state where the sensor stator 6 is integrally arranged with the stator 5 as described above, and a terminal portion of the signal line 8 of the sensor stator 6 and a terminal portion of signal line of a feeding portion of the stator 5 are fixed to the common terminal block 10, whereby a wiring process of the signal lines and a connecting process of the terminal portions can be concurrently performed. Therefore, an attachment configuration of the sensor stator 6 and an assembly process of the sensor stator 6 are riot required for the case 11 having a cylindrical shape.

Moreover, the sensor supporting components 7 are made of a non-magnetic material, so that a leakage of a magnetic flux can be suppressed.

Furthermore, the sensor stator 6 and the sensor supporting components 7 are connected by the rivets 13, and heads of the rivets 13 are crushed when the rivets 13 are tightened, whereby a length of the heads of the rivets 13 can be reduced in comparison with a length of heads of the screws 21, so that the rotary electric machine can be downsized in a rotary shaft direction.

A length of the sensor stator 6 in a rotary shaft direction is not equal to a length of the sensor rotor 2 in the rotary shaft direction, so that the rotary electric machine is not affected by a size variation in the rotary shaft direction of the stator and the rotor 1, and a constant output can be obtained. Moreover, the rotary electric machine is not affected by a deviation in the rotary shaft direction of the sensor stator 6 and the sensor rotor 2, which is caused by a vibration, and a constant output can be obtained.

Embodiment 2

Figure 6:
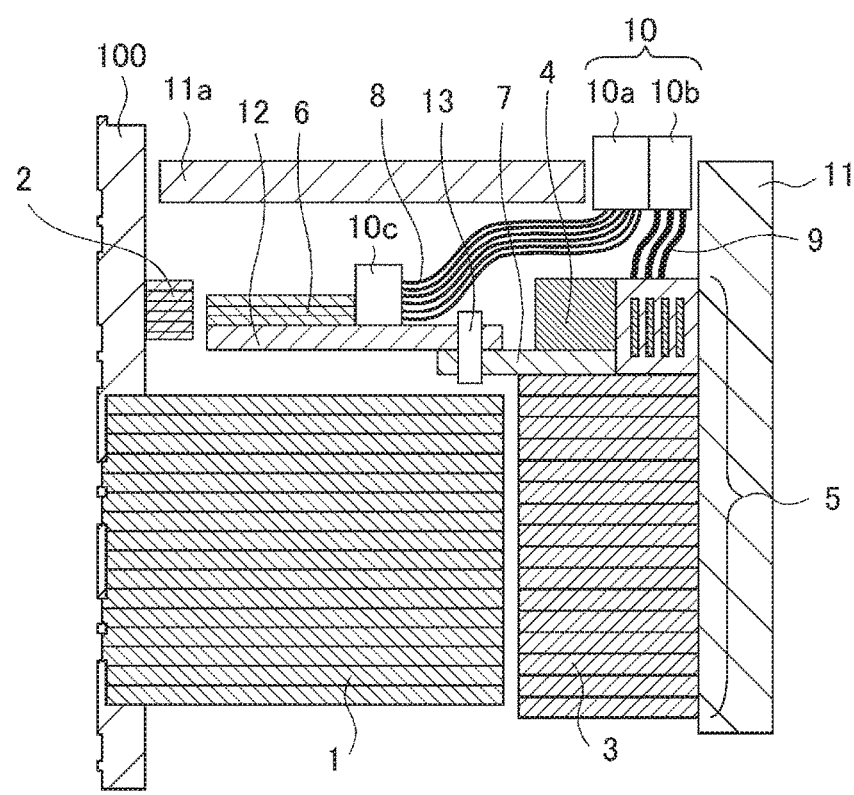
FIG. 6 is a cross-sectional view illustrating a rotary electric machine according to Embodiment 2 of the present invention.

FIG. 6 is a cross-sectional view illustrating a rotary electric machine according to Embodiment 2 of the present invention.

In the rotary electric machine according to Embodiment 2, the rotary electric machine has a configuration in which a sensor stator 6 is maintained to a sensor maintaining component 12 which is attached to sensor supporting components 7 by rivets 13. The sensor supporting components 7 are configured by using a non-magnetic material, and the sensor maintaining component 12 is configured by using a magnetic material such as iron. In addition, connecting portions of the sensor maintaining component 12 and the sensor supporting components 7, which are formed by using the rivets 13, has a configuration in which the sensor maintaining component 12 and the sensor supporting components 7 are connected at a plurality of positions in a circumferential direction of the rotary electric machine in a similar way according to Embodiment 1. Moreover, after the sensor maintaining component 12 is temporally fixed to the sensor supporting components 7 by using a screw, which is used for a temporally fixing process, in a similar way according to Embodiment 1, the sensor maintaining component 12 and the sensor supporting components 7 are fixed by the rivets 13. The other configurations according to Embodiment 2 are similar to the configurations, which are indicated in FIG. 1, according to Embodiment 1, so that an explanation is omitted.

The sensor stator 6 is fixed to the sensor maintaining component 12, and the stator 5 is inserted from a shaft direction to a case 11 having a cylindrical shape so as to be assembled in a state where a terminal portion of a signal line 8 of the sensor stator 6 and a terminal portion of a signal line of a stator 5 are fixed to a common terminal block 10.

The rotary electric machine is configured in such a way that the sensor stator 6 is maintained by the sensor maintaining component 12, so that the rotary electric machine is not affected by a shape of the sensor stator 6, and the sensor stator 6 can be attached to the stator 5. Therefore, one kind of the sensor stator 6 can be attached in a wide area from a rotary electric machine having a small diameter to a rotary electric machine having a large diameter.

Moreover, the sensor supporting components 7 are configured by using a non-magnetic material, so that a leakage of a magnetic flux can be suppressed, and the sensor maintaining component 12 is configured by using a magnetic material, so that the sensor maintaining component 12 has a large strength and can be easily processed even when the sensor maintaining component 12 has a complex shape.

Figure 7:
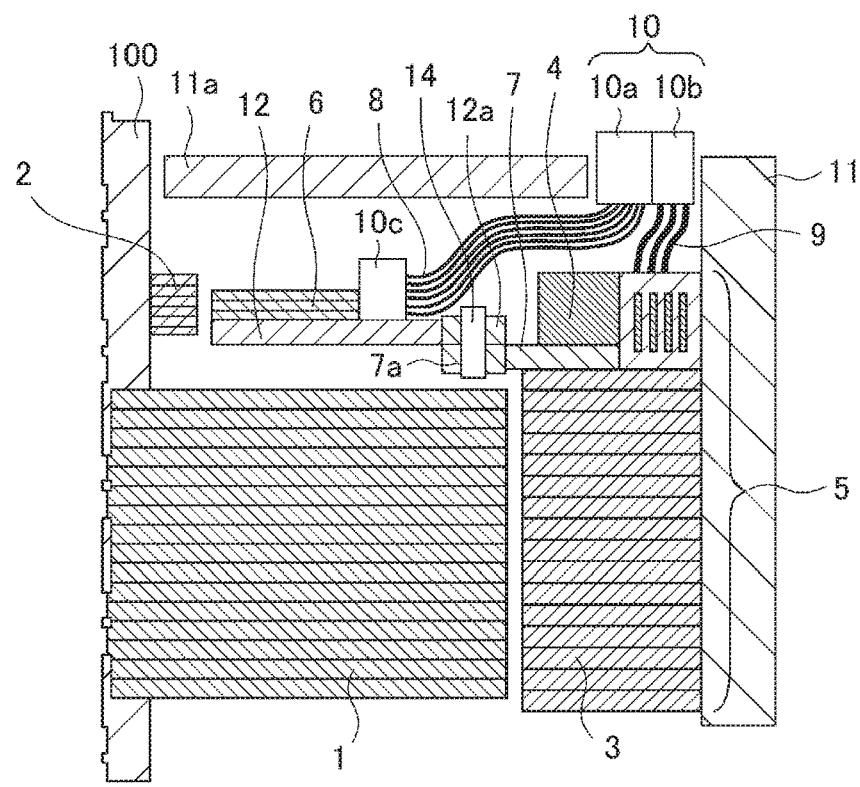
FIG. 7 is a cross-sectional view illustrating a modification example of the rotary electric machine according to Embodiment 2 of the present invention.

FIG. 7 is a cross-sectional view illustrating a modification example of the rotary electric machine according to Embodiment 2 of the present invention.

In the rotary electric machine according to Embodiment 2, the rotary electric machine has a configuration in which a connecting portion 7a of the sensor supporting components 7 and a connecting portion 12a of the sensor maintaining component 12 are formed by using a resin material, and an pin (referred to as a ultrasonic welding pin) 14, which is fixed by using a ultrasonic welding process, is inserted to the connecting portion 7a and the connecting portion 12a so as to be connected, whereby the sensor maintaining component 12 and the sensor supporting components 7 are fixed. In the rotary electric machine according to Embodiment 2, after the sensor maintaining component 12 is temporally fixed to the sensor supporting components 7 by using a screw, which is used for a temporally fixing process, the sensor maintaining component 12 and the sensor supporting components 7 may be fixed by the ultrasonic welding pin 14. The other configurations are similar to the configurations, which are indicated in FIG. 2, according to Embodiment 2, so that an explanation is omitted.

In the rotary electric machine according to Embodiment 2, the ultrasonic welding pin 14 is inserted to the connecting portion 7a and the connecting portion 12a while a resin of the connecting portion 7a and the connecting portion 12a is incited in a process where the ultrasonic welding pin 14 is inserted to the connecting portion 7a and the connecting portion 12a.

A concave and convex portion is formed at a surface of the ultrasonic welding pin 14, and the melted resin is engaged to the concave and convex portion, whereby the connecting portion 7a and the connecting portion 12a are fixed.

The incited resin is pulled to the concave and convex portion at the surface of the ultrasonic welding pin 14, and the ultrasonic welding pin 14, which is fixed by a welding process by using an ultrasonic wave, is used, whereby the resin can be pulled even when an axis deviation of the connecting portion 7a and the connecting portion 12a is large, and a constant fixing force can be obtained. Moreover, a part, which is corresponding to a screw head, is not required at the ultrasonic welding pin 14, so that the rotary electric machine can be downsized in a shaft direction in a fixing process by using the ultrasonic welding pin 14 in comparison with a fixing process by using a usual screw.

Moreover, in the rotary electric machine according to Embodiment 2, although it is explained that the connecting portion 7a of the sensor supporting components 7 and the connecting portion 12a of the sensor maintaining component 12 are formed by using a resin material, it is not limited that the connecting portion 7a and the connecting portion 12a are formed by using a resin material, and a connecting portion of the sensor stator 6 and the sensor supporting components 7 may be formed by using a resin material in a configuration of the rotary electric machine according to Embodiment 1, which is indicated in. FIG. 1.

Figure 8:
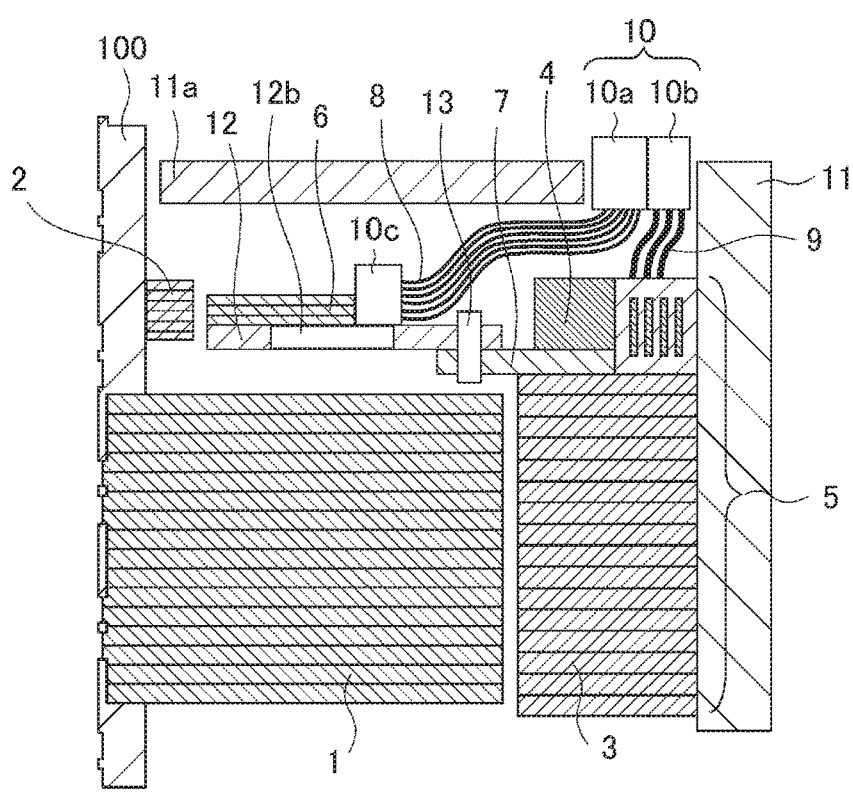
FIG. 8 is a cross-sectional view illustrating the other modification example of the rotary electric machine according to Embodiment 2 of the present invention.

FIG. 8 is a cross-sectional view illustrating the other modification example of the rotary electric machine according to Embodiment 2 of the present invention.

In the rotary electric machine according to Embodiment 2, the rotary electric machine has a configuration in which a hole 12b is formed at the sensor maintaining component 12. The other configurations are similar to the configurations, which are indicated in FIG. 6, according to Embodiment 2, so that an explanation is omitted.

The hole 12b is formed at the sensor maintaining component 12, whereby a weight reduction of the rotary electric machine can be realized. Moreover, it can be avoided that a resonance point of a vibration is caused.

Embodiment 3

Figure 9:
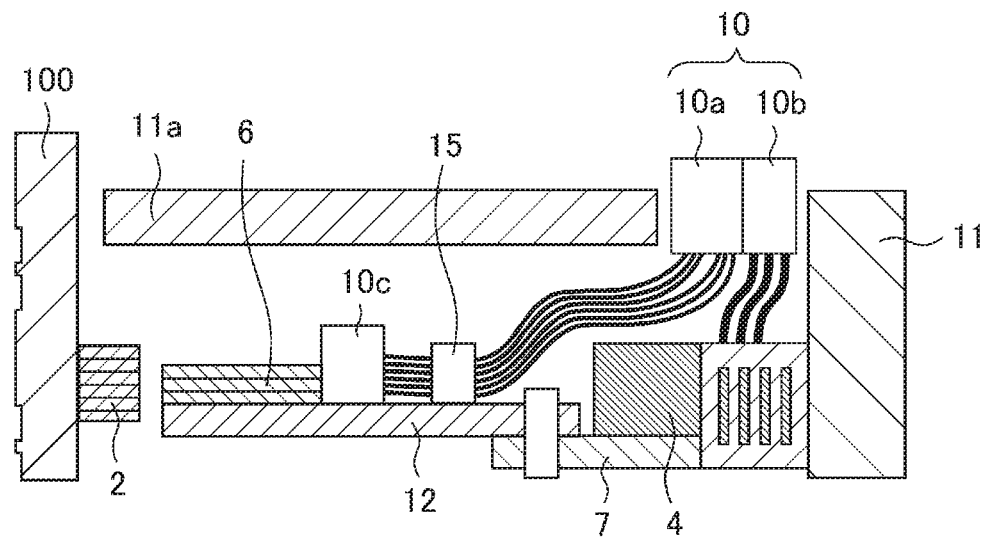
FIG. 9 is a cross-sectional view illustrating a main portion of a rotary electric machine according to Embodiment 3 of the present invention.
Figure 10:
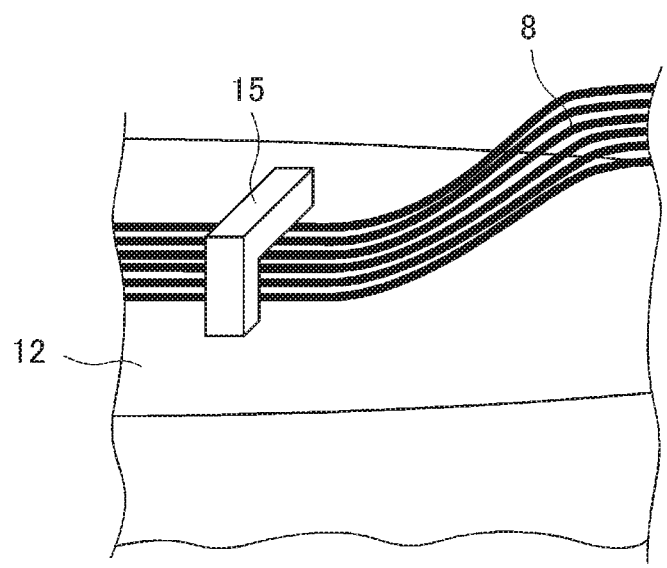
FIG. 10 is an oblique perspective view illustrating the main portion of the rotary electric machine according to Embodiment 3 of the present invention.

FIG. 9 is a cross-sectional view illustrating a main portion of a rotary electric machine according to Embodiment 3 of the present invention, and FIG. 10 is an oblique perspective view illustrating a maintaining portion of a signal line of a sensor stator in FIG. 9.

In the rotary electric machine according to Embodiment 3, a signal line 8 is maintained by a signal line maintaining component 15 having a reverse L shape, which is fixed to a sensor maintaining component 12.

The other configurations according to Embodiment 3 are similar to the configurations, which are indicated in FIG. 2, according to Embodiment 2, so that an explanation is omitted.

The signal line 8 is maintained by the signal line maintaining component 15, whereby a wiring process of the signal line 8 can be easily performed. Moreover, a deflection of the signal line 8 is reduced, and friction between the signal line 8 and a corner portion of the other component is reduced, so that a broken wire can be suppressed.

Figure 11:
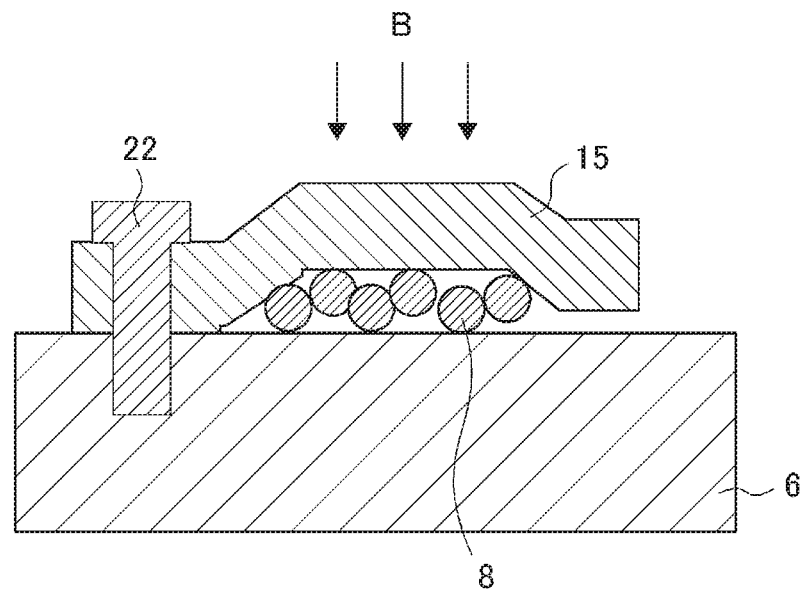
FIG. 11 is a cross-sectional view illustrating a main portion of a modification example of the rotary electric machine according to Embodiment 3 of the present invention.

FIG. 11 is a cross-sectional view illustrating a main portion of a modification example of the rotary electric machine according to Embodiment 3 of the present invention.

In the rotary electric machine according to Embodiment 3, the signal line maintaining component 15 is formed by using an elastic component, for example, a thin plate-shaped component which is made of iron, and the signal line maintaining component 15 is fixed to the sensor stator 6 by a screw 22 in such a way that, the signal line 8 is sandwiched between the sensor stator 6 and the signal line maintaining component 15. The signal line maintaining component 15, which is fixed to the sensor stator 6, maintains the signal line 8, which is wired and outputted from the sensor stator 6, in such a way that the signal line 8 is pressed by an elastic three of the signal line maintaining component 15 in an arrow B direction.

Embodiment 4

Figure 12:
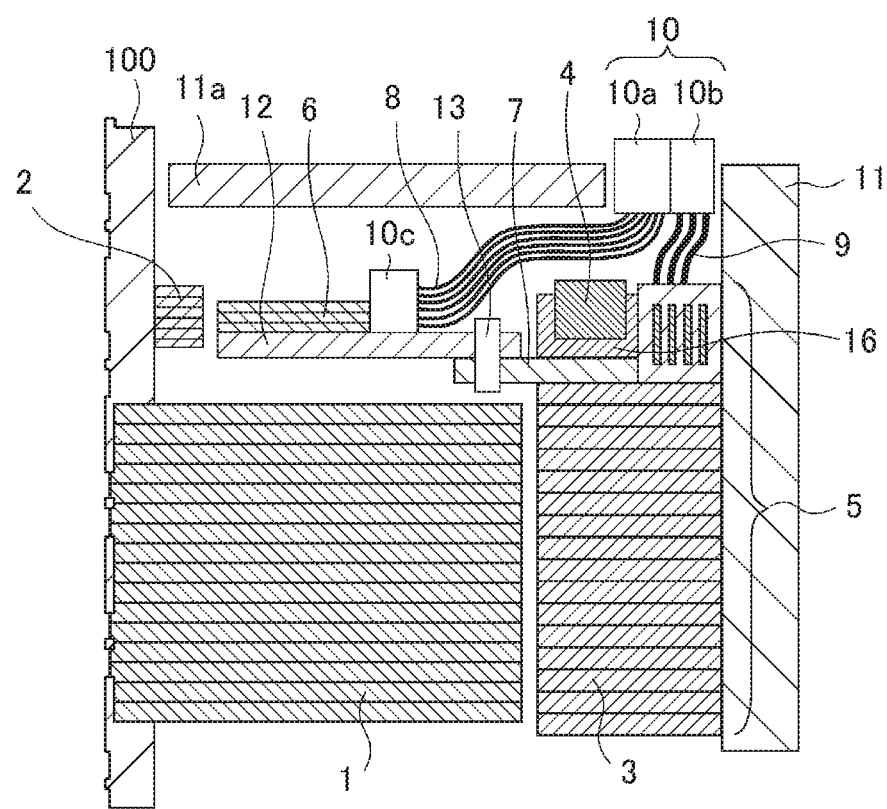
FIG. 12 is a cross-sectional view illustrating a rotary electric machine according to Embodiment 4 of the present invention.

FIG. 12 is a cross-sectional view illustrating a rotary electric machine according to Embodiment 4 of the present invention.

In the rotary electric machine according to Embodiment 4, the rotary electric machine has a configuration in which a bobbin 16 is mounted at a stator core 3 (in particular, a teeth portion which is provided at the stator core 3). The other configurations according to Embodiment 4 are similar to the configurations, which are indicated in FIG. 6, according to Embodiment 2, so that an explanation is omitted.

The bobbin 16 is mounted between a coil 4 and sensor supporting components 7, whereby an insulation capability of the coil 4 and the sensor supporting components 7 can be improved. Moreover, a shape of the bobbin is varied in accordance with a line diameter of the coil 4, whereby the rotary electric machine cal be corresponded to various winding specifications.

The sensor supporting components 7 are inserted to the bobbin 16 so as to be molded, whereby it can be prevented that the sensor supporting components 7 are dropped off from the bobbin 16 in a temporally attachment state before the coil 4 is wound around to a teeth portion of a stator core 3 and the sensor supporting components 7 are fixed by using a tension of the coil 4.

Embodiment 5

Figure 13:
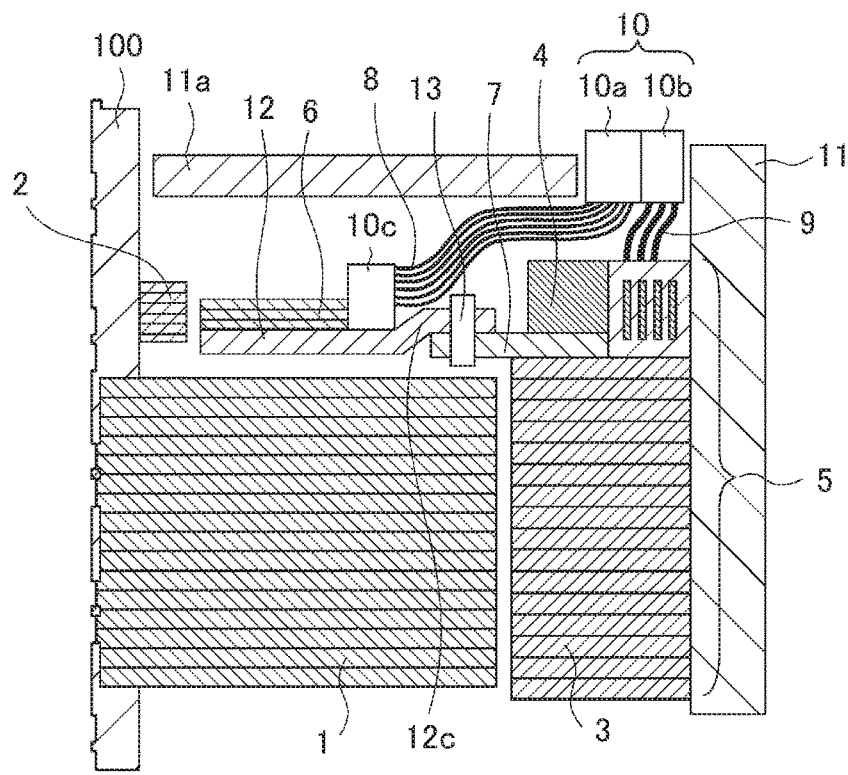
FIG. 13 is a cross-sectional view illustrating a rotary electric machine according to Embodiment 5 of the present invention.

FIG. 13 is a cross-sectional view illustrating a rotary electric machine according to Embodiment 5 of the present invention.

In the rotary electric machine according to Embodiment 5, the rotary electric machine has a configuration in which an end portion 12c of a sensor maintaining component 12, which is connected to sensor supporting components 7, is bent to the inside in a rotary shaft direction. The other configurations according to Embodiment 5 are similar to the configurations, which are indicated in FIG. 6, according to Embodiment 2, so that an explanation is omitted.

The end portion 12c of the sensor maintaining component 12 is bent to the inside in a rotary shaft direction, whereby a length of the sensor maintaining component 12 in a rotary shaft direction can be reduced.

Embodiment 6

Figure 14:
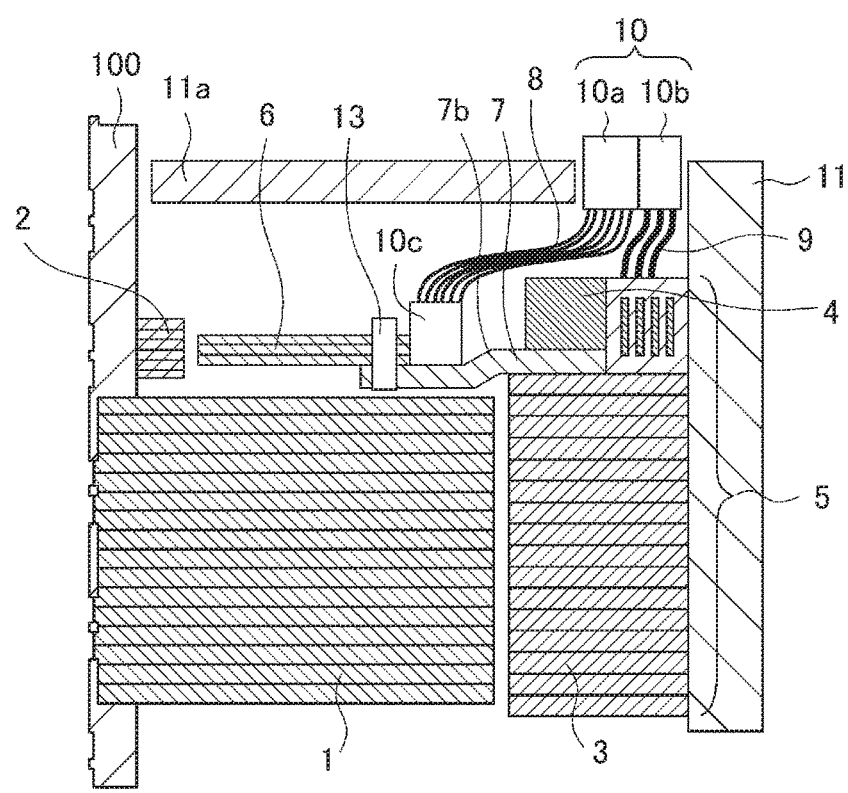
FIG. 14 is a cross-sectional view illustrating a rotary electric machine according to Embodiment 6 of the present invention.

FIG. 14 is a cross-sectional view illustrating a rotary electric machine according to Embodiment 6 of the present invention.

In the rotary electric machine according to Embodiment 6, the rotary electric machine has a configuration in which a central portion 7b of sensor supporting components 7 is bent to the inside in a rotary shaft direction. The other configurations according to Embodiment 6 are similar to the configurations, which are indicated in FIG. 1, according to Embodiment 1, so that an explanation is omitted.

In the rotary electric machine according to Embodiment 6, the central portion 7b of the sensor supporting components 7 is bent to the inside in a rotary shaft direction, whereby a length of the sensor supporting components 7 in a rotary shaft direction can be reduced.

In the present invention, in the scope of the present invention, it is possible that each of embodiments is freely combined, or each of embodiments is suitably modified or omitted.

DESCRIPTION OF THE SYMBOLS

"1" is a rotor; "2," a sensor rotor; "3,"a stator core; "4," a coil; "5," a stator; "6," sensor stator; "7," sensor supporting components; "8," a signal line; "9," a signal line, "11," a case; "12" a sensor maintaining component; "13," rivets; "14," a pin, "15," a signal line maintaining component; "16," a bobbin; "100," a rotary shaft.

What is claimed is:

1. A rotary electric machine comprising:
   a rotor and a sensor rotor, which are maintained to a rotary shaft and are arranged in a shaft direction of the rotary shaft;
   a stator which is faced to the rotor and is arranged at the inside of a case having a cylindrical shape; and
   a sensor stator connected to an end portion of the stator by sensor supporting components disposed on end portions in a shaft direction of the stator.

2. A rotary electric machine as recited in claim 1, wherein the sensor stator is maintained by the sensor maintaining component, which is connected to the sensor supporting components, and is supported to the sensor supporting components.

3. A rotary electric machine as recited in claim 1, wherein the sensor stator and the sensor supporting components are fixed by rivets.

4. A rotary electric machine as recited in claim 2, wherein the sensor maintaining component and the sensor supporting components are fixed by rivets.

5. A rotary electric machine as recited in claim 2, wherein a connecting portion of the sensor maintaining component and the sensor supporting components are molded by using a resin material, and the connecting portion is connected by an ultrasonic welding pin.

6. A rotary electric machine as recited in claim 1, wherein a connecting portion of the sensor stator and the sensor supporting components are molded by using a resin material, and the connecting portion is connected by an ultrasonic welding pin.

7. A rotary electric machine as recited in claim 2, wherein a hole is provided at the sensor maintaining component.

8. A rotary electric machine as recited in claim 2, further comprising a signal line maintaining component, which is provided at the sensor maintaining component, by which a wiring of the sensor stator is maintained to the sensor maintaining component.

9. A rotary electric machine as recited in claim 1, further comprising a signal line maintaining component, which is provided at the sensor stator, by which a wiring of the sensor stator is maintained to the sensor stator.

10. A rotary electric machine as recited in claim 2, wherein an end portion of the sensor maintaining component, which is connected to the sensor supporting components, is bent in a shaft direction of the rotary shaft.

11. A rotary electric machine as recited in claim 1, wherein the sensor supporting components, to which the sensor stator is attached, are bent in a shaft direction of the rotary shaft.

12. A rotary electric machine as recited in claim 1, wherein the sensor supporting components are made of a non-magnetic material.

13. A rotary electric machine as recited in claim 2, wherein at least one side of the sensor supporting components and the sensor maintaining component is made of a non- magnetic material.

14. A rotary electric machine as recited in claim 1, wherein a bobbin, to which a coil of the stator is wound, is mounted to a stator core of the stator, and the sensor supporting components are maintained between the stator core and the bobbin.

15. A rotary electric machine as recited in claim 14, wherein the bobbin and the sensor supporting components are inserted and molded.

16. A rotary electric machine as recited in claim 1, wherein a length of the sensor stator in a rotary shaft direction is different from a length of the sensor rotor in the rotary shaft direction.

17. A rotary electric machine as recited in claim 1, wherein the sensor stator is fixed to the case via the stator.

* * * * *